United States Patent Office 3,044,600
Patented July 17, 1962

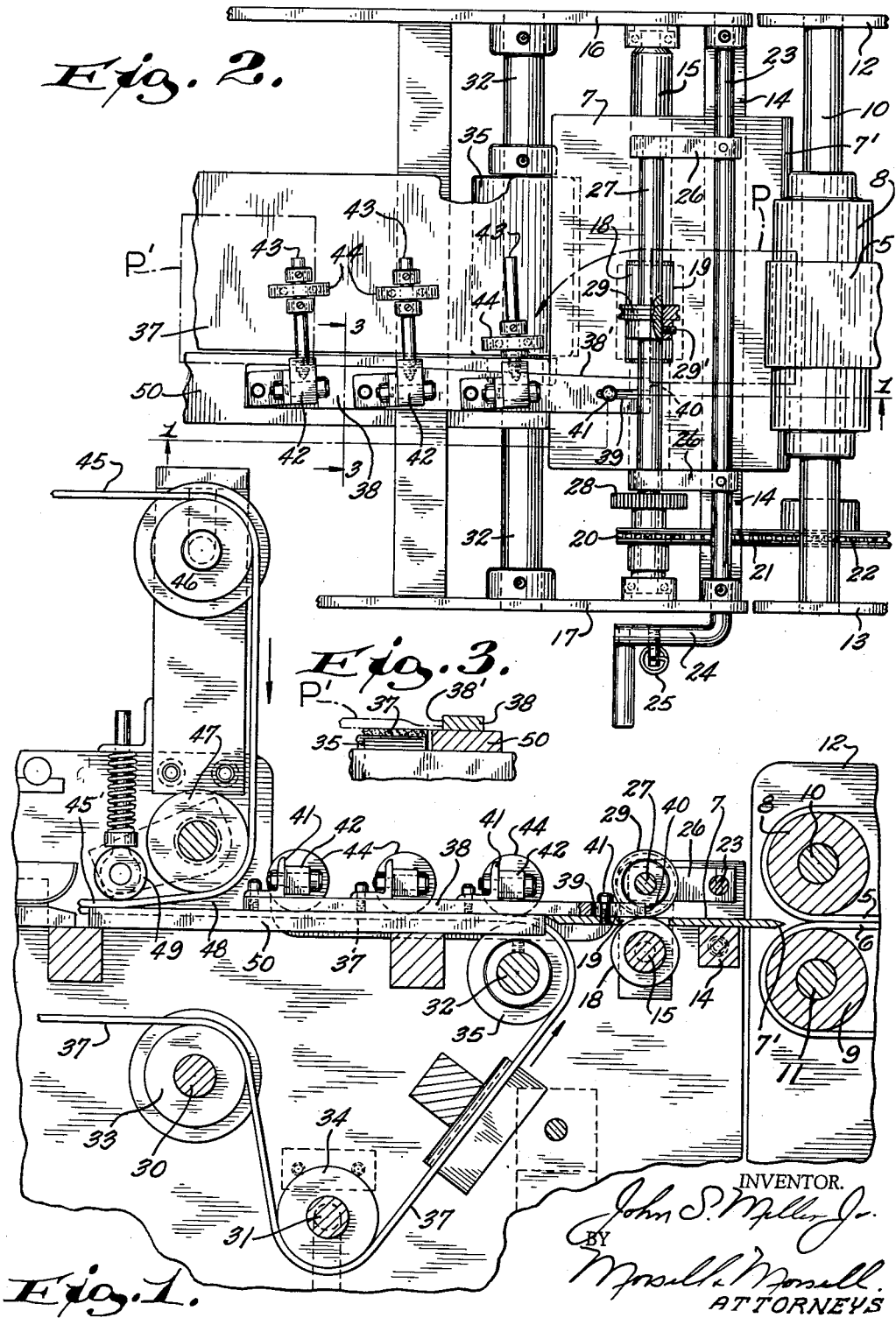

3,044,600
TURNING AND CONVEYING MECHANISM FOR FLAT LIGHTWEIGHT ITEMS
John S. Miller, Jr., Milwaukee, Wis., assignor to Pratt Manufacturing Corp., a corporation of Wisconsin
Filed Mar. 30, 1960, Ser. No. 18,529
7 Claims. (Cl. 198—33)

This invention relates to improvements in turning and conveying mechanism for flat lightweight items.

It has heretofore been proposed in devices for handling relatively heavy cartons, cans, or the like, to have said items engage an abutment while they are being conveyed on an endless belt. This causes turning of the items at right angles to their former direction of travel. These prior devices operate in a satisfactory manner with the relatively heavy articles for which they are intended. However, when it is attempted to use the mechanisms of these prior devices for the handling of flat lightweight packages of glassine or like material having little weight, the devices do not operate in a satisfactory manner. This is due to the fact that lightweight articles are inclined to bounce to various angles during and after being turned and do not proceed in an orderly fashion. Furthermore in these prior devices the turning is done while being conveyed on a single continuous conveyor which is not satisfactory with flat, lightweight items.

It is a general object of the persent invention to provide in apparatus for handling and conveying lightweight flat packages or the like, means for turning said packages at right angles as they are being conveyed, and for maintaining said items in a uniformly turned position and in a predetermined spaced relation and position as they are being conveyed away from the turning mechanism for further processing.

A further object of the invention is to provide a device as above described which is relatively simple in construction, foolproof in operation, and otherwise well adapted for the purpose described.

With the above and other objects in view, the invention consists of the improved turner for flat, lightweight items, and all of its parts and combinations, as set forth in the claims, and all equivalents thereof.

In the accompanying drawing, illustrating one complete embodiment of the preferred form of the invention, in which the same reference numerals designate the same parts in all of the views:

FIG. 1 is a fragmentary longitudinal sectional view through a package conveying machine embodying the improved turner, the view being taken approximately on the line 1—1 of FIG. 2;

FIG. 2 is a top view of the apparatus of FIG. 1; and

FIG. 3 is a fragmentary sectional view taken on the line 3—3 of FIG. 2.

Referring more particularly to the drawing, the device illustrated is particularly suited for use in conveying packages formed of tissue or like material which contain surgical sponges or like flat items. These packages may be either fully or partly completed. One of such packages is shown by dot and dash lines in FIG. 2, and is designated by the letter "P." It is to be understood, however, that the invention is suitable for use in turning other flat lightweight items having characteristics similar to surgical packages, and for turning packages made of plastic film or thin metal foil.

As the packages approach the turning mechanism they are being conveyed one after another, in line formation, between the endless belts 5 and 6, and are delivered at spaced intervals, one after another, from the belts onto a fixed table 7. The endless conveyor belts 5 and 6 travel around rollers 8 and 9 mounted on shafts 10 and 11 which are journalled in bearings in frame members 12 and 13.

The table 7 preferably comprises a flat sheet of metal which is supported on one or more cross members 14. The edge of the plate which faces the delivery conveyor is preferably sharpened as at 7' to better intercept the thin packages. A shaft 15 which has its ends suitably journalled in side frame members 16 and 17 carries a roller 18, the latter having an upper portion projecting upwardly into a rectangular opening 19 in the stationary table 7. The shaft 15 has a sprocket wheel 20 rigidly mounted thereon which is driven by an endless chain 21 from a sprocket wheel 22 on the shaft 11. Above the table 7 is a transverse rock shaft 23. One end of the rock shaft is rotatably supported in the side member 16 and the other end extends through the side member 17 and has a bent end 24 to which a spring 25 is attached in such a way as to exert a downward pull on the bent end 24. Spaced arms 26 have their inner ends rigidly connected to the rock shaft 23. A shaft 27 is rotatably supported in the outer ends of the arms 26, one end of the shaft projecting beyond its arm and being provided with a gear 28 which meshes with a like gear on the shaft 15 to cause driving of the shaft 27 when the gears are in engagement. The shaft 27 carries a package turning wheel 29 above the table opening 19, the periphery of the wheel being normally urged into engagement with the periphery of the roller 18 by the action of the spring 25, the latter tending to rock the shaft 23 and hence the arms 26 and wheel 29 to the position shown in FIG. 1. The hub of the wheel 29 has a set screw 29' so that the position of the wheel may be varied so suit the dimensions of the package.

Other shafts 30, 31 and 32 support rollers 33, 34 and 35 around which an endless belt 37 is trained. As the belt 37 passes around on the top of the roller 35 it is just ahead of the forward end of the table 7 in a position to intercept packages from the table.

Suitably supported on a plate 50 alongside one edge of the belt 37 is a guiding bar 38 having one end slotted as at 39 and forming an abutment end at 40. As shown in FIG. 3 the upper surface of the top stretch of the belt 37 is flush with the upper surface of the plate 50. A set screw 41 threaded into the table 7 is adapted to maintain the guiding bar 38 in a desired position of longitudinal adjustment so that the abutment end 40 is properly related to the dimensions of the package or other article which is to be turned. The guiding bar has a guiding edge 38' the first part of the length of which is slightly angled toward the belt and the remainder of which is straight and parallel to the direction of conveyor movement.

Mounted on top of the guiding bar 38 are one or more angle brackets 41. Pivoted to each bracket is an arm 42 carrying a projecting stud 43 equipped with a hold-down wheel 44 which is freely rotatable on the stud and which is urged by gravity into engagement with a package on the belt. In the example illustrated there are three hold-down wheel assemblies. The one closest to the package turning wheel 29 has one hold-down wheel engaging a portion of the belt which is close to the guiding bar 38. The other holddown wheel assemblies each comprise a wheel 44 set farther out on the belt. This exact position of the hold-down wheels may be varied by moving the set collars on the studs 43 to suit the requirements and dimensions of the package. It is preferred to slightly angle the brackets 41 on their securing bolts so as to cant the wheels 44 slightly in a direction to urge packages against the guiding bar 38 as will be hereinafter explained.

An upper endless conveyor belt 45 is trained around suitably supported rollers 46 and 47. This belt is so supported as to provide a tapering entrance throat 48 between it and the upper stretch of the belt 37 to receive packages which have been turned. Thereafter the belts run together with the packages therebetween, the upper belt having its stretch portion 45' yieldingly urged into engagement with the upper stretch of the lower belt 37 by a spring tensioned roller 49.

*Operation*

In use of the device the articles to be turned are delivered by the delivery belts 5—6 to the top of the fixed table 7. These items may be small flat packages of lightweight material or other articles having similar characteristics. The machine of the present invention is particularly adapted for the turning of packages formed of thin packaging paper such as white sulphite, glassine or oriented polyethylene. Such materials are commonly used in the packaging of surgical sponges. These packages, delivered onto the table 7, may be in partially completed condition. It is important that they be turned 90° and then conveyed in a fixed predetermined position and relationship so that when they are subsequently delivered to additional mechanism such as end or side folders, the folds will be straight. If the partially completed packages are conveyed in assorted positions, then the finished packages will have end and side folds at assorted angles. One of such packages is shown in dot and dash lines in FIG. 2 and is designated by the letter P. The dimensions of the apparatus are so worked out with respect to the dimensions of the package that almost simultaneously with release of the trailing edge of the package from the bite of the rollers 8—9 of the leading edge of the package is engaged in the bite between the package turning wheel 29 and the roller 18. The guide bar 38 is longitudinally adjusted through the bolt 41 in the slot 39 to bring the abutment end 40 into a position so that it is engaged by the corner of the package (as shown in FIG. 2) almost at the same time that the leading edge of the package is gripped by the turning wheel 29. The package P which is now on the stationary table 7 will be quickly turned 90° by the package turning wheel 29 to bring its leading edge against the edge 38' of the guiding bar 38. One of the pivoted hold-down assemblies on the arms 42 is positioned and adjusted to engage the top of the package, under the influence of gravity, immediately after it has been turned to prevent it from bouncing and to keep it in contact with the edge 38'. By having the first wheel 44 close to the guide bar the package is not engaged by said first wheel until after the package has been turned, but then it is immediately engaged, as the instant it is released by the turning wheel 29 it is engaged from on top by the first wheel 44. If the wheel 44 were farther out on its stud it would engage the package too soon. Thus the mechanism is so worked out as to control the package at all times from both above and below while not interfering with the turning. With a package of the size indicated at P the first hold-down assembly includes a single roller 44 which is set relatively close to the edge 38 of the guiding bar. This roller is over the endless belt 37. Immediately thereafter the belt 37 takes over to move the package along toward the left in FIG. 2, always bringing it under one or more additional hold-down wheel assemblies 42, the wheels 44 of which are set a predetermined distance out depending upon the dimensions of the package. P' indicates a package which has been turned and which is about to be moved away by the endless belt 37. From FIG. 3 it will be seen that the edge of the package overhangs the belt 37 a short distance and is on the top of the plate 50 with its extreme edge against the guiding edge 38' of the guiding bar 38.

Referring now to FIG. 1, the turned packages pass into the throat 48 and between the belts 37 and 45 to be engaged by conveyor belts both from above and below and be thereby maintained in predetermined position and relationship.

It is clear from the above that the combination of the delivery belts, stationary table, turning mechanism, hold-down mechanism and take-away belt mechanism has been so worked out as to provide for the controlled turning and conveying of lightweight flat objects. Furthermore, the use of the hold-down wheel assemblies, with the wheels preferably canted slightly, in conjunction with the guiding bar 38 maintains the packages in turned position against the edge 38' until they are passed into the grip of the upper and lower take-away belts 37 and 48. Thus at no point are the packages left in uncontrolled condition. Instead they are always gripped from both above and below. This is very important when dealing with relatively lightweight items.

It is to be understood that the present invention is not to be limited to the exact details of construction shown and described for obvious modifications will occur to persons skilled in the art.

What I claim is:

1. In a turning and conveying mechanism for flat lightweight items having a delivery conveyor for delivering the items in sequence, a fixed table positioned to receive said items from said delivery conveyor, said table having an opening and having a forward edge, means including rotatable turning means engageable with the item from above and below said opening to turn the item while it remains in the plane of the table, a take-away conveyor belt positioned close to said forward edge of the table so that the belt is overlapped by a portion of the item after the item has been turned and while it is still in the grip of said turning means, and means located over said take-away belt and positioned for engagement with the top of said overlapping portion of the turned item immediately after turning has been completed and immediately after the item has been released by said turning means for controlling the position of the item on the take-away conveyor.

2. In a turning and conveying mechanism for flat lightweight items having a delivery conveyor for delivering the items in sequence, a fixed table positioned to receive said items from said delivery conveyor, stop means on said table positioned to be engaged by a corner of an item, turning means engageable with the item after its corner has been stopped to turn the item while it remains in the plans of the table, a take-away conveyor positioned close to the table so that it is overlapped by a portion of the item after the item has been turned and while it still being acted on by said turning means, and means located over said take-away conveyor and positioned for engagement with the top of said overlapping portion of the turned item immediately after turning has been completed and immediately after engagement of the turning means with the item has ended for controlling the position of the item on the take-away conveyor.

3. In a turning and conveying mechanism for flat lightweight items having a delivery conveyor for delivering the items in sequence, a fixed table positioned to receive said items from said delivery conveyor, stop means on said table positioned to be engaged by a corner of an item, turning means associated with said table and engageable with the item after its corner has been stopped to turn the item while it remains in the plane of the table, a take-away conveyor positioned close to said table so that it is overlapped by a portion of the item after the item has been turned and while it is still being engaged by said turning means, and gravity influenced means located over said take-away conveyor and positioned for engagement with the top of said overlapping portion of the turned item immediately after turning has been completed and immediately after engagement of the turning means with the item has ended for controlling the position of the item on the take-away conveyor.

4. In a turning and conveying mechanism for flat lightweight items having a delivery conveyor for delivering the items in sequence, a fixed table positioned to receive said items from said delivery conveyor, stop means on said table positioned to be engaged by a corner of an item, turning means associated with said table and engageable with the item after its corner has been stopped to turn the item while it remains in the plane of the table, a take-away conveyor positioned close to the table so that it is overlapped by a portion of the item after the item has been turned and while it is still engaged by said turning means, a guiding bar overlapping both the table and take-away conveyor and positioned for engagement by an edge of the turned item immediately after turning has been completed for limiting such turning movement and for guiding the item on the take-away conveyor, and hold-down means over the take-away conveyor and pivoted to said guiding bar and urged by gravity into engagement with the top of an item on said take-away conveyor and immediately after engagement of the turning means with the item has ended.

5. In a turning and conveying mechanism for flat lightweight items having a lead edge with a corner, said mechanism having a delivery conveyor for delivering the items in sequence, a fixed table positioned to receive said items from said delivery conveyor, said table having an opening, a driven roller having an axis which is transverse of the direction of movement of the items rotatably supported below said table in a position to project into said opening with its uppermost portion substantially flush with the upper surface of the table, a stop on said table positioned to be engaged by a corner of an advancing item at approximately the time that its lead edge is over said roller, a pivotally mounted arm above the table, a wheel rotatably supported by an outer portion of said arm on an axis parallel to the axis of said roller and positioned so as to be pivotally urged into engagement with the top of an item over said roller to cooperate with said roller in turning the item while it remains in the plane of the table, means for driving said wheel, a take-away conveyor positioned so that it is overlapped by a portion of the item after the item has been turned and while it is still in the grip of said turning wheel and roller, a guiding bar overlapping said table and take-away conveyor and extending in the direction of movement of said take-away conveyor and positioned for engagement by an edge of the turned item immediately after turning has been completed for limiting such turning movement to 90° and for guiding the item on the take-away conveyor, and hold-down means over said take-away conveyor and pivoted to said guiding bar and normally urged into engagement with the top of an item on said take-away conveyor immediately after the item has been released by said turning wheel and roller.

6. In a turning and conveying mechanism for flat lightweight items having a lead edge with a corner, said mechanism having a delivery conveyor for delivering the items in sequence, a fixed table positioned to receive said items from said delivery conveyor, said table having an opening, a driven roller having an axis which is transverse of the direction of movement of the items rotatably supported below said table in a position to project into said opening with its uppermost portion substantially flush with the upper surface of the table, a stop on said table positioned to be engaged by a corner of an advancing item at approximately the time that its lead edge is over said roller, a pivotally mounted arm above the table, a wheel rotatably supported by an outer portion of said arm on an axis parallel to the axis of said roller and positioned so as to be pivotally urged into engagement with the top of an item over said roller to cooperate with said roller in turning the item while it remains in the plane of the table, means for driving said wheel, a lower endless take-away conveyor positioned so that it is overlapped by a portion of the item after the item has been turned and while it is still in the grip of said turning wheel and roller, a guiding bar overlapping said table and take-away conveyor and extending in the direction of movement of said conveyor and positioned for engagement by an edge of the turned item immediately after turning has been completed for limiting such turning movement to 90° and for guiding the item on the take-away conveyor, hold-down means supported above said lower endless take-away conveyor and normally urged into engagement with the top of an item on said take-away conveyor immediately after the item has been released by said turning wheel and roller, and an upper endless conveyor means engageable with the tops of the items while they are being taken away by the lower take-away conveyor and immediately after the items pass said hold-down means.

7. In a turning and conveying mechanism for flat lightweight items having a delivery conveyor for delivering the items in sequence, a fixed table positioned to receive said items from delivery conveyor, means including a longitudinally adjustably mounted guiding bar having a portion over said table with an end forming a stop on said table positioned to be engaged by a corner of an advancing item for turning the item while it remains in the plane of the table, a take-away conveyor positioned so that it is over-lapped by a portion of the item after the item has been turned and while it is still being acted on by said turning means, another portion of said guiding bar overlapping said take-away conveyor and being positioned for engagement by an edge of the turned item immediately after turning has been completed for limiting such turning movement and for guiding the item on the take-away conveyor, and hold-down means supported above said take-away conveyor and normally urged into engagement with the top of an item on said take-away conveyor and immediately after the item is no longer acted upon by said turning means.

References Cited in the file of this patent

UNITED STATES PATENTS

| | | |
|---|---|---|
| 2,190,418 | Davidson | Feb. 13, 1940 |
| 2,243,557 | Finster | May 27, 1941 |

FOREIGN PATENTS

| | | |
|---|---|---|
| 479,675 | Germany | July 20, 1929 |